C. E. BALDWIN.
MEASURING MACHINE.
APPLICATION FILED JULY 19, 1918. RENEWED APR. 12, 1921.

1,379,159.

Patented May 24, 1921.
4 SHEETS—SHEET 1.

Witness
J. E. Nordstrom
H. W. Sandberg

Inventor
Charles Ernest Baldwin
By L. Arthur Baldwin,
Attorney

C. E. BALDWIN.
MEASURING MACHINE.
APPLICATION FILED JULY 19, 1918. RENEWED APR. 12, 1921.

1,379,159.

Patented May 24, 1921.
4 SHEETS—SHEET 2.

UNITED STATES PATENT OFFICE.

CHARLES ERNEST BALDWIN, OF JAMESTOWN, NEW YORK, ASSIGNOR TO REGISTROMETER COMPANY, OF BUFFALO, NEW YORK.

MEASURING-MACHINE.

1,379,159.   Specification of Letters Patent.   Patented May 24, 1921.

Application filed July 19, 1918, Serial No. 245,662. Renewed April 12, 1921. Serial No. 460,656.

*To all whom it may concern:*

Be it known that I, CHARLES ERNEST BALDWIN, a citizen of the United States, residing at the city of Jamestown, in the county of Chautauqua and State of New York, have invented certain new and useful Improvements in a Measuring-Machine, of which the following, taken in connection with the accompanying drawings, is a specification.

The invention relates to measuring machines for cloth and similar flexible materials which may be drawn through between operating rollers to thereby indicate the measurement on registering mechanism; and the invention consists in providing a simple registering mechanism which is operable by drawing the cloth or material to be measured between spring pressed rollers, the large inch registering disk being arranged to automatically return to zero by gravity when a spring plunger is manually released, the manually operable releasing mechanism also disconnecting the roller actuating and registering mechanism, and returning the yard or higher numerals to zero and separating said spring pressed rollers by gravity to release the material measured and permit the insertion of other material; and the invention consists in the novel features and combinations hereinafter set forth and claimed.

In the drawings.

Like characters of reference refer to corresponding parts in the several views.

The numeral 25 designates the main supporting frame which has the plates 26 and 27 attached to the rear side thereof for the support of the registering mechanism, a cover 29 for said registering mechanism being attached to a stud 28 by a screw 30 centrally located on the frame plate 26.

The cover 29 has an opening 31 therein for the releasing and actuating plunger 32 and also has the openings 33 for the numerals which register the measurement. Said cover 29 also has a spring notching knife or shear attached thereon to mark the exact end of the measurement, the knife or shear consisting of the blade portion 34 which is rotatively mounted on the wrist pin 35 near the reinforced edge of the cover 29 with a shear cut along the fixed blade 36, which is also attached to the cover 29 extending out therefrom. The rotatively mounted blade 34 has a handle 37 thereon, and a spring 38 on pin 35 to return it to normal position.

The frame 25 has the shelf 39 extending out at right angles on the side opposite the registering mechanism. The shelf 39 is covered or hollow supporting in an opening 40', see Fig. 1, therein the lower roller 40 upon a spring actuated rotatively mounted plate 41. The plate 41 is rotatively raised and lowered on trunnions 42 and 43 on opposite end edges thereof, said plate 41 extending through the opening 44 in the edge of the main frame 25 so that the trunnion lug 43 may be mounted in the rear frame plate 26 and the trunnion 42 in a lug 45 within the hollow or covered shelf 39, the actuating spring 46 being located within the rear portion of the main frame adjacent to the trunnion 43.

Figures 17, 18, 19, 20, 21, 22:
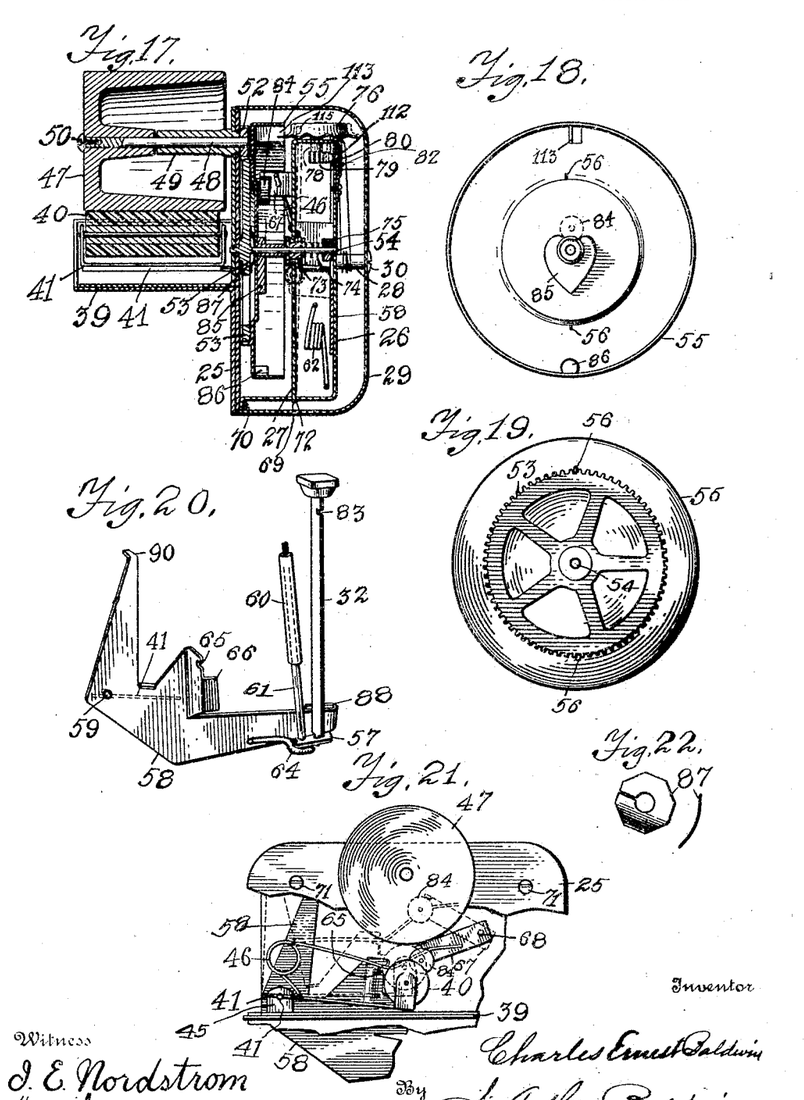
Fig. 17 is a sectional view at line 17—17 in Fig. 5 showing the different parts of the machine in their relation to one another and in dotted lines the sidewise movement of said higher numeral gear wheels.
Fig. 18 is an elevation of the cam and weight side of the large registering disk.
Fig. 19 is an elevation of the gear side of said large registering disk.
Fig. 20 is a perspective view of the plunger and dash pot attached to the actuating lever for the toothed rack which in turn rotates the toothed higher numeral wheels in returning said wheels to zero.
Fig. 21 is an elevation of the measuring rollers between which the material to be measured is drawn, the supporting plate being broken away and showing the actuating mechanism for the spring, with said rollers in their normally separated set position ready to receive the material to be measured therebetween.
Fig. 22 shows plan and edgewise views of the separating spring between the large gear wheel and the large registering disk.

A large upper roller 47 is mounted on a shaft 48, Fig. 17, preferably within a projecting journal sleeve 49 on the main frame 25, being attached to said shaft 48 by means of the screw 50. The periphery 51 of the large roller 47 is knurled so as to insure engagement of the cloth or material to be measured. The periphery of the lower roller 40 is preferably covered with rubber so as to preserve a positive contact upon the under side of the material to be measured as it presses said material against the knurled surface of the roller 47, thereby insuring an exact and positive movement of the two measuring wheels 40 and 47 when the material to be measured is drawn therebetween.

Figure 3:
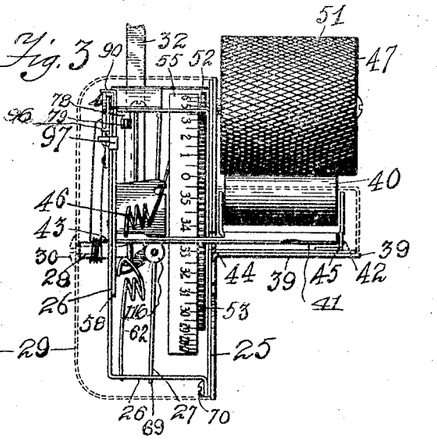
Fig. 3 is an end elevation of the measuring machine with the cover shown in Fig. 2 removed from the registering mechanism, with the plunger in the released position and the measuring disk about to return to zero by gravity.

The shaft 48 extends through the sleeve 49 and main frame 25 and has attached on its inner end the pinion 52 which meshes in the large gear wheel 53, Figs. 3, 17 and 19. The gear wheel is mounted on the shaft 54 to rotate the same on journals in the supporting frame plates 25 and 26 when the measuring rollers and gear 52 are rotatively actuated. The lugs 56 are preferably provided on the disk 55 so as to mesh in substantially diametrally opposite teeth in the gear wheel 53 so as to rotatively move said registering disk 55 with the gear wheel 53 when the large measuring wheel 47 is rotatively actuated by the material to be measured.

Figure 10:
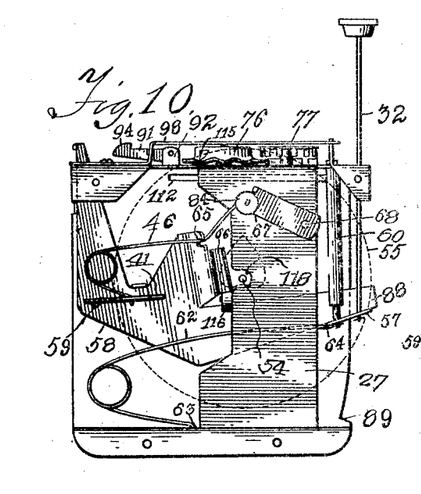
Figs. 10 and 11 are elevations of the registering mechanism of the measuring machine with the rear supporting plates removed showing in dotted outline the steps in the cam action of the single registering disk, Fig. 10 showing the plunger in the released position and the large registering disk released and about to return to zero position, and Fig. 11 showing the plunger in the lowered or normally set position and said disk with the cam thereon in the zero position.

The plunger 32 is loosely attached at its lower end in a lug 57, Figs. 10 and 20, on a bell-crank lever plate 58 which has the horizontal arm and the vertical or upwardly extending arm with the angular lug 66 therebetween, the plate 58 being pivoted at 59 by the trunnion or lug 43 on plate 41. A dash pot barrel 60 is attached to the supporting frame plate 26 at its upper end and has the piston rod 61 which is attached at its lower end to the lug 57 to which the plunger 32 is likewise attached, which dash pot 60 relieves the upward movement of the plunger 32 and spring bell-crank lever plate 58.

Figure 11:
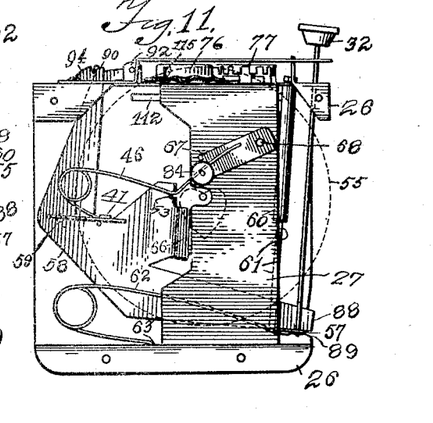

The spring action to the bell-crank lever plate 58 and plunger 32 is given by the spring 62, Figs. 10 and 11. The lower arm of spring 62 is attached at 63 in supporting plate 26 and the upper arm 64 in a notch in the lug 57 thereby giving a strong spring action to the bell-crank lever 58. The lower arm of spring 46, Figs. 3, 10, 11, 16 and 21, is attached to plate 41 and the upper arm engages first in a notch 65, Figs. 3, 10, 11, 20 and 21, in the angular lug 66 to assist in the actuation of the bell-crank lever 58, and second said upper arm extends through a hole in the bent out end of the pivotally mounted arm 67 as shown in Fig. 17, said arm 67 moving with the end of the spring 46 as it moves upward and downward with the movement of the bell-crank lever 58 and plunger 32. The arm 67 extends alongside the movable frame plate 27, Figs. 3, 10, 11, 13 and 17, and is pivotally attached thereto at 68, Figs. 10 and 11, by a suitable rivet. The rocking or movable plate 27 is supported upon a tenon 69, Figs. 13 and 17, which extends through a closed slot 72 in the plate 26. The upper end is turned at a right angle to provide a shelf which extends to within a spaced distance of the upright portion of the plate 26, which plate 26 is in bridging form and is attached at both top and bottom to the main upright plate or portion of the frame 25 by screws 70 at the lower edge, and 71 from the front side at the top, as shown in Fig. 21.

Figures 12, 13, 14, 15, 16:
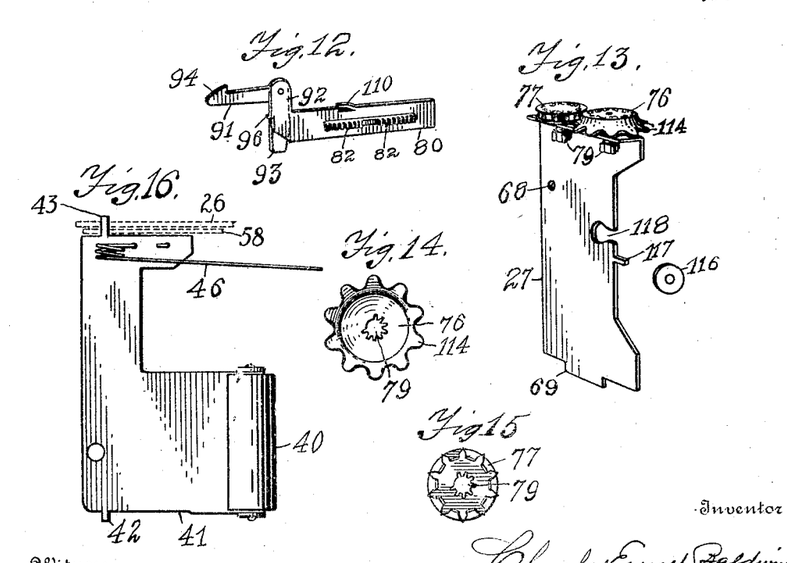
Fig. 12 is a perspective view of the toothed rack for operating the two small registering gear wheels for the yard or higher numerals, showing the spring bell-crank on the rack which holds the large bell-crank lever plate and actuates said rack to return said yard or higher numeral gear wheels to zero when the large registering disk has been returned to zero by gravity.
Fig. 13 is a perspective view of said gear wheels for the yard or higher numerals as mounted on their supporting plate with the rack engaging pinions thereon.
Figs. 14 and 15 show plan views of the under sides of said higher numeral gear wheels showing the intermeshing gear teeth on the outer edges of said gear wheels and said rack engaging pinions thereon.
Fig. 16 is a plan view of the spring actuated plate and lower roller of the measuring rollers thereon removed from the machine.

The rocking or movable plate 27 is supported as stated in a slot 72 in the part 26 with freedom of sidewise movement, which movement is controlled by a channeled roller 73, Fig. 17, inserted in the open ended slot 118, Figs. 10, 11 and 13, in said plate 27 and onto the crosswise arbor or shaft 54, which arbor is rotated by the toothed gear wheel 53 and pinion 52. The channeled roller 73 is slidably mounted on the arbor 54 and has a coil spring 74 and a keyed ring 75 to hold the coil spring 74 and press said roller 73 firmly against the journal of the registering disk 55 thereby holding the disk 55 under spring pressure against the toothed gear wheel 53 and the lugs 56 in constant engagement between the teeth of said gear wheel so that when the large measuring roller 47 is rotated the disk 55 will be rotatively actuated.

The movable or rocking plate 27 supports on its horizontal upper end the two yard or higher numeral inter-meshing gear wheels 76 and 77 which gear wheels 76 and 77 are rotatively mounted on vertically mounted short arbors 78 which support the gear wheels 76 and 77 on their upper ends and the segment pinions 79, Figs. 3, 13, 14, 15 and 17, on their lower ends. A toothed rack plate 80 is slidably supported on the upper portion of the rear side of the frame plate 26 on a lug or bracket piece 81, Fig. 5, the rack teeth 82, Figs. 12 and 17, extending inwardly through a slot 112, Figs. 10, 11 and 17, in plate 26, as shown in Figs. 3 and 17.

Figures 1, 4:
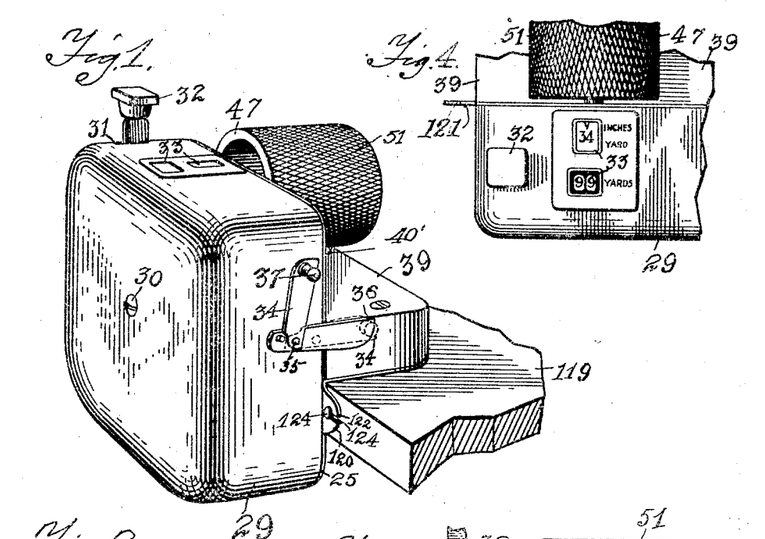
Figure 1 is a perspective view of the improved measuring machine attached to the side of a store counter or similar support upon which the material to be measured may be spread.
Fig. 4 is a top plan view of a portion of the operating roller and measuring machine showing the numerals of a registered measurement and the spring plunger in the normally set or non-released position.
Figure 2:
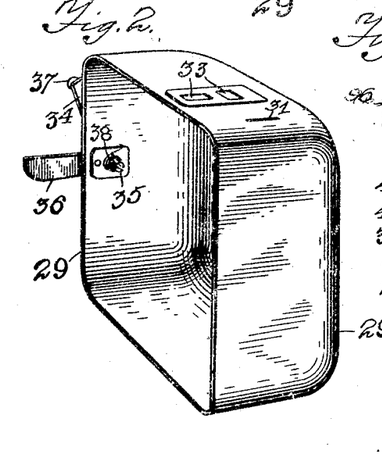
Fig. 2 is a perspective view of the cover for the registering mechanism removed from the measuring machine.
Figure 5:
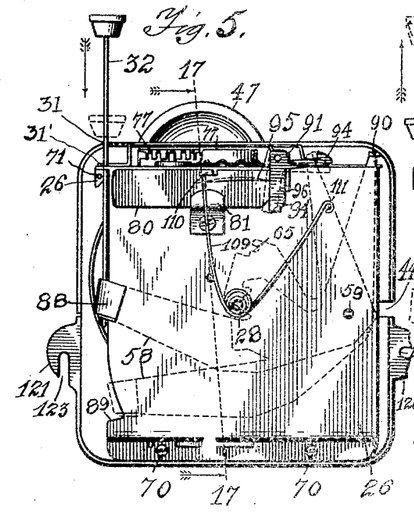
Fig. 5 is an elevation of the measuring machine with the cover removed from the registering mechanism showing the spring plunger action by dotted outline and arrows.
Figure 6:
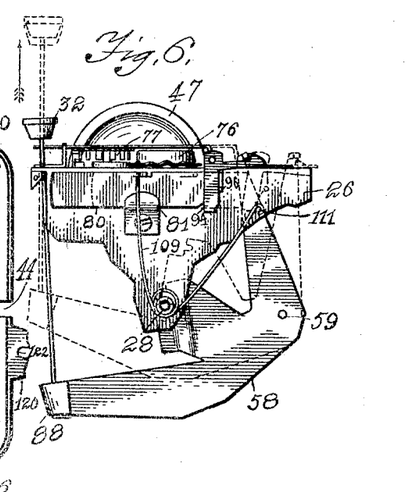
Fig. 6 is an elevation of the plunger and a portion of the registering mechanism showing said plunger in the set or lowered position and in dotted outline the released position.
Figure 8:
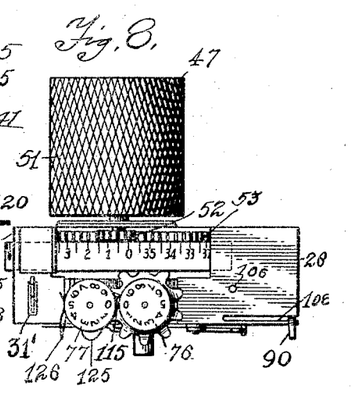
Fig. 8 is a similar view with the cover plate removed to more fully reveal the registering mechanism.

When the measuring machine is in the normally set position with the plunger 32 locked by the notch 83, Figs. 1 and 20, on the end wall of the slot 31', Fig. 8, in the frame plate 26, the rocking or movable upright plate 27 is pressed over and the spaced pinions 79 are placed in front of the ends of the two series of rack teeth 82 and ready to inter-mesh with said rack teeth when the arm 90 moves the rack plate 80 toward the pin 111, Figs. 5 and 6. At the same time the end of the upper arm of the spring 46 is bent downward by the depression of the plunger 32 carrying downward the arm of the large bell-crank 58 and a roller 84 on arm 67 therewith pressing said roller into the V-shaped upper end of the heart shaped cam 85 to hold it at the zero position. The cam 85 stands at zero with its V-shaped point downward toward a weight 86 within the rim of the cup shaped disk 55 and the larger portion of the heart shaped cam 85 is below the arbor of the cup shaped disk 55 to thereby provide a double weight which automatically moves the disk 55 back to zero by gravity when said disk is released by the plunger 32 on the arbor or shaft 54. The roller 84 moves around the heart shaped cam, should disk 55 lag in returning to zero by gravity, thereby insuring its return when the plunger 32 is pressed downward to the set position.

A small leaf spring 87, Fig. 17, is provided between the cup-shaped disk 55 and the toothed gear wheel 53 to press said cup-shaped registering disk 55 toward the movable upright plate 27 to thereby separate the lugs or projections 56 from their engagement between the teeth of the gear wheel 53 thereby permitting said registering disk 55 to automatically rotate and return to zero by gravity, as hereinbefore described.

The movable plate 27 is rocked sidewise by the manual downward pressure on the plunger 32 which moves the arm of the bell-crank 58 downward being guided in line by the return bend end 88 of said arm 58 which end 88, Figs. 5, 6, 10 and 11, extends around the edge of the plate 26, the pressure on the plunger 32 moving said end 88 downward into the stop notch 89 as shown in dotted outline in Fig. 5, the plate 58 being shown in solid line in Fig. 6 in said lowered position. The notch 89 forms a stop for the horizontal arm of the bell-crank 58 in its downward movement.

The upper end of the vertical arm of the bell-crank lever 58 is turned to one side, as shown at 90, Figs. 5, 6, 7 and 8, to engage a spring dog or second spring bell-crank lever 91, which is small and pivotally attached to an upwardly projecting lug 92 on the rack plate 80. The dog or bell-crank 91 has the downwardly projecting arm 93 which acts as a trigger to disengage the hook shaped arm 94 of said bell-crank 91 from the angularly turned end 90 of the vertical arm of the larger spring bell-crank 58 when it draws the rack plate 80 in the return to zero movement. The smaller bell-crank 91 is also spring controlled as shown by the small leaf spring 95, Fig. 5, the spring 95 permitting, as shown in dotted outline in Fig. 5, the snap engagement of the hooked arm 94 by the angular or hooked end 90, the trigger arm 93 having a stop 96 against which the spring 95 presses the arm 93 except when the bell-crank lever 91 is engaged by the hooked end 90 which is during the time that the plunger 32 and large bell-crank lever 58 are in the normally lowered position, as shown in Figs. 1, 6 and 11, in which position the parts of the measuring machine are locked standing ready with the pressure and measuring rollers 40 and 47 separated ready for the insertion of the material to be measured; the end of said material to be measured being placed exactly at the edge of the blade 36.

The operation of measuring after the material is inserted continues as follow: The plunger 32 is released by moving the rocking plunger 32 away from the end wall of the notch 31', thereby permitting the full force of the spring 62 to press upward on the end 88 of the horizontal arm of the bell-crank lever 58, the end 64 of the spring 62 engaging in a notch beneath the lug 57 upon which the rocking plunger 32 is loosely mounted preferably through a hole in the lug 57 with a cotter pin to hold it loosely in place so that it may rock backward and forward into and out of the locking notch 83.

Figure 7:
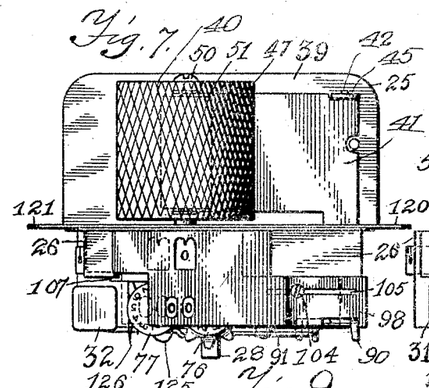
Fig. 7 is a top plan view of the measuring machine with the cover removed from the registering mechanism, said registering mechanism being in the normal set position at zero for registering a measurement.
Figure 9:
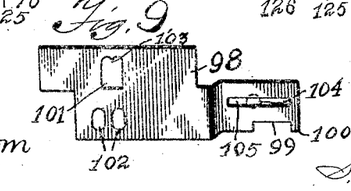
Fig. 9 is a plan view of the sliding cover plate which shuts from view the operation of the registering mechanism while changing.

The upward movement of the plunger 32 is stopped at the required point by the firm contacting of the spring pressed vertical arm of the bell-crank 58 when it strikes against the stopping lug 97, Fig. 3, on the edge of the plate 26. Said lug 97 is preferably struck from the edge of the sheet metal plate 26. In this operation the turned end 90 of said vertical arm has also moved back the rack 80 and returned the gears 76 and 77 to zero and withdrawn a sliding cover plate 98, Figs. 7 and 9. Said arm 90 extends up through the notch 99 of said plate 98 and engages against the lug 100, to thereby draw said cover plate 98 toward the stop 97; in which position the numerals on the registering disk and gears are fully disclosed through the openings 101 and 102, said holes 101 and 102 showing through the larger openings 33 in cover 27, as shown in Fig. 4. The point 103 in the opening 101 marks the exact zero position of the large disk 55 when the registering mechanism is returned to zero, as shown in Fig. 7. The plate 98 is slidably held in line by a screw 104 in the slot 105, which screw enters the top of the frame plate 26 in hole 106, as shown in Figs. 7 and 8. The opposite end of the plate 98 is held in line by the upturned lug 107, Fig. 7, on the top of frame plate 26.

The hooked end 90 is held in line in the slot 108, as shown in Fig. 8. The slidably mounted rack plate 80 is pressed away from the hooked end 90 by a coil spring 109, Fig. 5, around the stud 28, one spring end engaging beneath a lug 110 struck from the plate 80 and the other spring end engaging around the releasing pin 111 for the trigger arm 93 of the small bell-crank 91. This arrangement of the spring 109 presses the rack plate 80 firmly away from the hook 90. The rack piece 82 extends through a slot 112 as shown in Fig. 17 and Figs. 10 and 11. The projecting teeth 82 strike against the end of the slot thereby limiting the movement away from the hooked end 90 when released from the hook arm 94 of the spring controlled bell-crank 91.

When the mechanism is in position for registering the measurement, the material to be measured may be drawn through between the pressure roller 40 and measuring roller 47 in either direction, the forward movement of said material rotating the roller 47 and shaft 48 with pinion 52 theron, which pinion meshes in the toothed gear wheel 53 thereby turning the large measuring disk 55. The backward movement of the material through the rollers 40 and 47 reverses this action permitting the correction of an over measurement. For cloth and similar measurements, the large disk 55 is divided into the thirty-six inch measurement of one yard. The first large numeral registering gear 76 engages the projecting tooth 113 on the disk 55 between its teeth 114. The second large numeral gear wheel 77 is moved one step by lug 115, Figs. 10 and 11, on wheel 76 when a ten yard measurement has been recorded on wheel 76, which registering mechanism may be continued by adding additional higher numeral wheels when larger measurements are necessary, as for example in cloth mills.

The return of the registering mechanism to zero after a measurement is attained is as follows: The plunger 32 is pressed downward, the initial pressure pressing the vertical wall of the lug 66 onto the surface of the roller 116, Figs. 3 and 13, which roller is mounted on a pin 117 on the inner edge of the rock plate 27 at one side of the arbor 54, said rollers 116 being shown unmounted in order to show the pin 117 integral with the lock plate 27, and the flanged roller 73 on said arbor is entered in the open ended slot 118 in the inner edge of said rock plate 27. The pressure of the lug 66 on the roller 116 presses the rock plate 27 and roller 73 on arbor 54 away from the disk 55, which disk 55 is pressed by the curved leaf spring 87 against said roller 73 thereby following the rock plate 27 and withdrawing the projections 56 from engagement with the toothed gear wheel 53, the coil spring 74 allowing this sidewise movement of these parts. The release of the registering disk 55 frees said disk from restraint and the gravity weights 85 and 86 hereinbefore described, assert themselves turning said disk 55 to the zero position. The plunger 32 continues its downward movement until end 88 strikes the notched stop 89 Fig. 5 in which position the notch 83 is in correct position to engage the end wall of slot 31' as shown in Fig. 8, thereby placing all the parts in the set or normal locked position. This sidewise movement in the registering mechanism totally disconnects the measuring roler 47 from the registering mechanism so that said roller 47 may be rotated or spun in either direction without disarranging the mechanism of the machine in any way. This total disconnection is an essential feature since the large knurled roller 47 is easily rotated by catching upon the garments or by manual interference while standing in the normally set position.

The sidewise movement of the plate 27 moves each of the gears 79 into correct position in front of its respective series of rack teeth 82 to thereby return the higher or yard numeral registering gears 76 and 77 to zero when the rack holding plate 80 is moved endwise toward the stop 97. This endwise movement is attained by the engagement of the hooked end 90 with the spring hooked arm 94 of the small spring bell-crank 91 so that when the plunger 32 is released from the notch 83 in slot 31' and springs upward under the force of spring 62 the turned end 90 draws the small bell-crank 91 and rack plate over until the lower end of the trigger arm 94 strikes the pin 111 thereby releasing said turned end 90 from the hooked arm 94 and letting the spring pressed rack plate 80 spring back to normal position. At the same time the arm 90 draws the cover plate 98 back into correct position to uncover the numeral openings 101 and 102 and also simultaneously moving the roller 84 and the arm attached thereto upward by means of the spring 46 carrying upward the lug 66 and relieving the roller 116 from the sidewise pressure on rocking plate 27, thus permitting the spring 74 to press the rocker plate 27 and disk 55 back into engagement with the toothed gear wheel 53, thus returning all the parts to the registering position for a new measurement.

Click springs 125 and 126, Figs. 7 and 8, engage the teeth of the gears 76 and 77 thereby preserving the line up of the numerals on said gears, which numerals correspond to the number of teeth on the pinion 79. For example in said pinion 79 there are ten teeth and a space or straight side untoothed and on the gear wheels 76 and 77 there are ten numerals; hence when the rack teeth 82 turn the higher numeral gears 76 and 77 the correct number of teeth to restore each of said higher numeral gears to the zero position in which they stand opposite one another and show through the two openings 102, said rack teeth 82 engage the untoothed portion of the gears 79 slipping past said gears so that they remain in correct position. Thus for example, if the number of yards on the gears 76 and 77 were twenty-nine the gear 77 would show the 2 and the gear 76 the 9. The pinions 79 would have moved one for the gear 77 two points and for the gear 76 nine points so that in returning to zero said rack teeth 82 would turn back the pinion for gear 77 the two teeth and then slip by, while the series of rack teeth for gear 76 would move the pinion and said gear back nine points and then slip by, thereby returning said pinions and gears to the zero position with great accuracy.

The sliding cover plate 98 is provided for the numerals on disk 55 and gears 76 and 77 so that the operator will not be misled by the changing numerals on said registering disk and gear wheel.

It should also be noted that the downward movement of the plunger 32 carries downward the roller 84 on the pivoted arm 67 so that said roller 84 centers the gravity returned heart shaped cam 85 and thereby resiliently holds the registering disk 55 at the zero position, as described.

The downward movement of the plunger 32 also gives a limited downward pressure on the spring 46, the short arm of which engages in the pivotally mounted roller supporting plate 41 for the lower roller 40, the pressure being limited by the stop 89, Fig. 5, for the downward movement of the bell-crank 58. This stop of the downward movement of the spring 46 removes its pressure from the plate 41 and roller 40, thereby permitting said roller 40 to drop by gravity away from the roller 47 and release the material to be measured from the clamping grip of the rubber and knurled surfaces of said rollers, the exact end of the measurement having been first marked by the downward movement of the knife 34 which notches the edge of the material at the exact end of the measurement as registered by the registering mechanism. It will be noted that the registering disk 55 is returned to zero by the downward movement of the plunger 32 and that the higher numeral gears 76 and 77 are returned to the zero position by the upward movement of said plunger 32. This arrangement is made so that said disk and gears will not set against one another in their return to zero movements.

When the machine is attached to the edge of the counter or other support 119 with the parts in normal position, all that the operator needs to know concerning its construction and use is to always start with the machine in the set position shown in Fig. 1. The material to be measured is first inserted between the rollers 40 and 41 with its end adjacent the plate 36. The plunger 32 is then released, the upward spring movement of said plunger being eased by the dash pot 60 to prevent jarring the different portions of the mechanism, which release returns all the parts to the registering position for the measurement. The material is then drawn through until the exact amount of the measurement is registered on the registering disk and gears, at which point said material is notched by the operator by the spring knife 34 thereby marking the end of the measurement. The plunger 32 is again set by the operator thereby covering the numerals and opening the rollers ready for a new measurement. The cover 98 is necessitated by the operator's liability to confusion during the return to zero movement of the registering wheels should they be left uncovered, and also on account of the improved appearance.

The measuring machine is preferably attached to the edge of the counter, table or other support 119, Fig. 1, by means of lugs 120 and 121, Figs. 1, 5 and 7, the lug 120 having a horizontal slot 122 and the lug 121 having a vertical or hooked slot 123. Spaced screws or nails 124 are provided in the edge of the counter or other support 119 and the lugs 120 and 121 are placed sufficiently below the shelf 39 so that said shelf may rest upon the support 119 and one of the spaced nails 124 may be first received in the horizontal slot 122 preferably pressing to the bottom of said open ended slot permitting the turning downward of the machine so that the hooked slot 123 in the lug 121 can hook tightly over the opposite nail or screw. Since the manual pressure upon the machine is either downward or endwise as in drawing material to be measured therethrough, this method of attachment is preferred. In the design of the machine and the method of attachment to the support it is preferable to have a rounded or smooth exterior with as few projections to catch the clothing of the operator as possible.

In order to briefly describe the operation which has been so fully hereinbefore given, it should be borne in mind that the operator starts with the plunger 32 in the normal locked position midway of the return to zero actuation of the registering mechanism and the inch registering disk stands at zero. The operator first inserts the cloth into position between the rollers 40 and 47 and, holding the cloth in position, releases the locked plunger 32 by pushing it sidewise or away from roller 47 thereby permitting the spring 62 to move or spring said plunger 32 upward until the upwardly extending arm of the bell crank 58 strikes a stop on the plate 26. As hereinbefore described this upward movement of the plunger returns the yard registering disks to zero, thereby completing the return to zero actuation. This movement also clamps the cloth between the rollers 40 and 47 so that the operator can draw the cloth between said rollers as rapidly as desired until the end of the measurement reaches the line of the knife 34 when said knife 34 may be moved downward cutting a notch and marking the end of the measurement. As the cloth is drawn through between the rollers 40 and 47, the registering mechanism is actuated as hereinbefore described, the exact measurement appearing in the openings 33. The operator then presses the plunger 32 downward to its stop 89 and into its normally locked position as shown in Figs. 1 and 6 thereby releasing the cloth and resetting the inch disk of the measuring mechanism ready for a new measurement.

It is apparent from this brief description that the normal position of the measuring mechanism is midway of the return to zero actuation of said registering mechanism which position leaves the rollers 40 and 47 open to receive the cloth and the release of the plunger clamps the cloth and finishes the return to zero; in other words, the full return to zero actuation of the registering mechanism is that the inch registering disk is returned to zero by the downward movement of the plunger 32 and the return to zero of the yard registering disks is attained by the upward spring movement of said plunger 32. This simple measuring operation can be repeated as often as desired, the machine being always in position for the reception of the cloth if the plunger 32 is in said midway locked position.

I claim as new:—

1. A measuring machine comprising registering mechanism, measuring actuating means, means so connecting said actuating means to said registering mechanism as to register a measurement thereon, and means for temporarily disconnecting said actuating means from said registering mechanism to prevent derangement thereof when not in use.

2. A measuring machine comprising registering mechanism, an actuating roller connected to said registering mechanism to register a measurement thereon when said roller is turned by drawing the material to be measured in contacting relation thereby, and means for operatively disconnecting said actuating roller from said registering mechanism after registering said measurement to prevent derangement thereof.

3. A measuring machine comprising registering mechanism, an actuating roller connected to said registering mechanism to register a measurement thereon when said roller is turned by drawing the material to be measured in contacting relation thereby, and a common means for operatively disconnecting said actuating roller from said registering mechanism after registering said measurement and for setting said registering and actuating mechanism in readiness for the next measurement.

4. A measuring machine comprising registering mechanism, spring pressed rollers connected with said registering mechanism to register a measurement thereon by drawing the material to be measured between said rollers, and a plunger and spring bell-crank to disconnect said operative connection of said rollers and registering mechanism and to separate said spring pressed rollers.

5. A measuring machine comprising registering mechanism and actuating mechanism therefor, and means to normally lock said actuating and registering mechanisms midway of the return to zero actuation of said registering mechanism.

6. A measuring machine comprising registering mechanism and actuating mechanism therefor, a catch to normally set said actuating and registering mechanisms midway of the return to zero action of said registering mechanism, said actuating mechanism operatively disconnecting from said registering mechanism in approaching said set position to prevent derangement thereof while not in use.

7. A measuring machine comprising a registering mechanism having separate portions thereof independently returnable to zero, actuating mechanism connected to said registering mechanism to register a measurement thereon, and a common means to separate said actuating mechanism and registering mechanism and to return said portions of said registering mechanism to zero while separated from said actuating mechanism.

8. A measuring machine comprising registering mechanism, spring pressed rollers connected to said registering mechanism to actuate the same by drawing the material to be measured therebetween, and a common means for disconnecting said rollers from said registering mechanism and for releasing the spring pressure of said rollers to allow them to drop apart and receive another piece of material to be measured.

9. In a measuring machine, registering mechanism, a revolubly mounted roller actuatingly connected with said registering mechanism, a pressure means bearing against said revolubly mounted roller to actuate said roller by the material to be measured being drawn between said pressure means and said roller, and a common means for releasing both said pressure means and said registering mechanism so that said pressure means may drop from said roller and said registering mechanism may return to zero.

10. A measuring machine comprising a registering disk adapted to return to zero by gravity, an actuating roller geared to said registering disk to turn the same, a second roller spring pressed against said actuating roller to turn said registering disk by the material to be measured being drawn between said rollers, and a common releasing and setting means for said second roller and said registering disk permitting said spring pressed roller to drop away from said actuating roller by gravity and said registering disk to return to zero by gravity and to set said mechanisms in readiness for a new measurement.

11. A measuring machine comprising a spring pressed sidewise movable registering disk adapted to return to zero by gravity when unrestricted, an actuating roller connected to said disk to rotate the same and register a measurement when said roller is turned by drawing the material to be measured in contacting relation thereby, and a manually actuated plunger mechanism adapted to release said registering disk and permit a spring sidewise disengagement of the same and return to zero by gravity.

12. In a measuring machine, a frame consisting of a main frame plate, a bridge plate attached to the main frame plate and an upright rock plate supported therein, an actuating roller and gear journaled in said main frame plate, registering mechanism operatively supported in said bridge and rock plates, and a spring plunger and bell-crank lever to release and set said registering mechanism and assist in its return to zero.

13. A measuring machine comprising a main frame plate having a shelf on one side thereof to receive the material to be measured, an actuating roller revolubly mounted on said frame plate above said shelf, a spring pressed roller mounted in said shelf to press against said actuating roller, a bridge plate attached to the opposite side of said frame from said shelf, registering mechanism supported in said bridge plate portion of said frame and gear connected to said actuating roller to register measurements on said registering mechanism by the material to be measured being drawn between said rollers, and a reciprocating spring plunger and bell crank lever adapted to place the parts of the measuring machine in position for registering a measurement by the spring upward movement of said plunger and to reset said parts of said measuring machine by the manual downward movement of said plunger.

14. A measuring machine comprising registering mechanism, spring pressed rollers connected to said registering mechanism to actuate the same by the material to be measured being drawn therebetween, a slidably mounted cover plate for the numerals on said registering mechanism, and a reciprocating spring plunger and bell-crank lever adapted to slidably move said cover plate to screen said numerals during changes of measurement and disclose said numeral when said changes are attained.

15. A measuring machine comprising registering mechanism, spring pressed rollers connected to said registering mechanism to actuate the same by drawing the material to be measured therebetween, a reciprocating spring pressed plunger and bell-crank lever adapted to place the measuring mechanism in position for registering a measurement by the releasing upward movement of said plunger and bell crank, and to finish the return to zero movement of said registering mechanism and set the parts of the measuring mechanism ready for a new measurement by the downward resetting movement of said plunger and bell-crank.

16. In a measuring machine suitable actuating mechanism, registering mechanism comprising numeral disks adapted to be moved into and out of meshing engagement with one another to permit the return of different portions of said mechanism to the zero position at different times, and a reciprocating actuating means to return said different portions at said different times.

17. In a measuring machine, registering mechanism comprising a weighted inch disk and higher numeral disks intermeshing with one another at each rotation to register a measurement, means for releasing said weighted inch disk permitting it to return to zero by gravity, a spring bell-crank and toothed rack and segment pinions to return said higher numeral disks to zero by said means for releasing said inch disk, substantially as and for the purpose specified.

18. In a measuring machine, registering mechanism comprising a weighted inch disk and higher numeral disks intermeshing with one another at each rotation to register a measurement, means for releasing said weighted inch disk permitting it to return to zero by gravity, a heart-shaped cam on said inch disk, and a spring pressed roller to lock said inch disk in the zero position after said return to zero by gravity.

19. A measuring machine comprising registering mechanism, spring pressed rollers connected to said registering mechanism to actuate the same by drawing the material to be measured therebetween, a reciprocating spring plunger and bell-crank lever adapted to place the measuring mechanism in position for registering a measurement and to reset said measuring mechanism in readiness for a new measurement, and a dash pot for said spring plunger and bell-crank lever to ease the measuring mechanism and prevent the disarrangement thereof.

In testimony whereof I have affixed my signature in the presence of two witnesses.

CHARLES ERNEST BALDWIN.

Witnesses:
  H. A. SANDBERG,
  I. E. NORDSTROM.